United States Patent [19]
Hayashi et al.

[11] Patent Number: 5,600,771
[45] Date of Patent: Feb. 4, 1997

[54] METHOD OF DOCUMENT LAYOUT PROCESS AND SYSTEM THEREFOR

[75] Inventors: Naoki Hayashi; Kazuo Saito, both of Tokyo, Japan

[73] Assignee: Fuji Xerox Co., Ltd., Japan

[21] Appl. No.: 536,472

[22] Filed: Sep. 29, 1995

Related U.S. Application Data

[63] Continuation of Ser. No. 319,254, Oct. 6, 1994, Pat. No. 5,499,331, which is a continuation of Ser. No. 748,323, Aug. 21, 1991, abandoned.

[51] Int. Cl.$^6$ ............................................. G06F 1/00
[52] U.S. Cl. ................................ 395/774; 395/779
[58] Field of Search .................... 395/144, 145, 395/146, 147, 148

[56] References Cited

U.S. PATENT DOCUMENTS

| | | | |
|---|---|---|---|
| 4,949,287 | 8/1990 | Yamaguchi et al. | 395/148 |
| 4,970,665 | 11/1990 | Doi et al. | 395/148 |
| 5,151,975 | 9/1992 | Shiraki et al. | 395/148 X |
| 5,181,162 | 1/1993 | Smith et al. | 395/145 |
| 5,208,905 | 5/1993 | Takakura et al. | 395/148 |
| 5,293,473 | 3/1994 | Hesse et al. | 395/145 X |

OTHER PUBLICATIONS

WordPerfect Quick Start – Chapter 5: Formatting Pages. pp. 138–147, Copyright 1988 by Que Corporation.

International Standard – *ISO 8613: Information Processing – Test and Office Systems – Open Document Architecture (ODA) and Interchange Format* – Part 2: Document structures, Sep. 1, 1989.

Hayashi et al., *A prototype of an ODA document processing system (3) – layout process,* 37th General Meeting of the Information Processing Society of Japan, pp. 1857–1858, Sep., 1988.

Murakami et al., *A Method of Document Layout Process Based on ODA (1) – Issues on Backtrack,* 40th General Meeting of the Information Processing Society of Japan, pp. 598–59, First ½ of 1990.

Matsudaira et al., *A Method of Document Layout Process Based on ODA (2) – A Consideration of Efficiency,* 40th General Meeting of the Information Processing Society of Japan, pp. 600–601, First ½ of 1990.

Yamaguchi et al., *A Method of Document Layout Process Based on ODA (3) – Processing Repetitive Construction,* 40th General Meeting of the Information Processing Society of Japan, pp. 602–603, First ½ of 1990.

André et al., *Structured Documents,* pp. 20–23, 62–63, 67–68 and 72, Cambridge University Press, 1989.

*Primary Examiner*—Heather R. Herndon
*Assistant Examiner*—Cliff N. Vo
*Attorney, Agent, or Firm*—Welsh & Katz, Ltd.

[57] ABSTRACT

A document processing system for generating a layout structure of a document so as to conform to predetermined restriction conditions relating to document layout. Upon generating the layout structure, a detection unit detects whether or not the current document layout structure conforms to the restriction conditions. When the detection unit detects an unconformity between the layout structure and the restriction conditions, a backtrack range determining unit determines desired one of constituent elements forming the document logical structure for layout to be restarted taking a backtrack influence range into consideration.

4 Claims, 13 Drawing Sheets

METHOD OF DOCUMENT LAYOUT PROCESS AND SYSTEM THEREFOR

This application is a continuation of Ser. No. 08/319,254, filed Oct. 6, 1994, now U.S. Pat. No. 5,499,331, which is a continuation of Ser. No. 07/748,323, filed Aug. 21, 1991, now abandoned.

BACKGROUND OF THE INVENTION

1. Field of the Invention

The present invention relates to a method of document layout process for generating a layout structure of a document on the basis of a logical structure of the document, and a document processing system for embodying the method.

2. Description of the Related art

Conventional document processing techniques (which will be sometimes referred to as the layout process) for generating a layout structure of a document on the basis of a logical structure of the document include, for example, an ODA technique (ISO8613: Information Processing-Text and Office Systems Open Document Architecture (ODA) and Interchange Format (1989)) and a TNT technique (J. Andere, R. Furuta, V. Quint: Structured Documents, Cambridge University Press (1989)). In these techniques, layout process is carried out on the basis of a restriction condition (which will be sometimes referred to as the 'layout directive restriction') relating to the layout of logical objects in a logical structure and a restriction condition (which will be sometimes referred to as the 'structure generation restriction') wherein a candidate for generating a layout structure is described.

The layout directive restriction is, for example, that "all structures below this logical object must be laid out in a specific frame."

The structure generation restriction is, for example, that "this page contains within the page a body frame and if necessary, a footnote frame."

The layout process must be carried out while satisfying two sorts of such layout directive and structure generation restrictions. However, there are many candidates for the generatable layout structure and whether or not the layout structure is suitable depends on the amount of contents of a logical structure to be laid out and also on the layout directive restriction. For this reason, given the document logical structure and the two sorts of restrictions, it is difficult for a processor taking a role of layout process to infer a suitable layout structure on the basis of these data.

For the purpose of overcoming this difficulty, there has been considered such a document processing system based on try and error manner that one of candidates for a layout structure is selected for layout and if the layout process ends in a failure, then the processing is returned (which will be referred to as the backtrack, hereinafter) to such a state as to allow selection of another candidate to retry the layout process and then the layout process is restarted.

Such document processing system is well known and disclosed in literatures (proceedings), for example, in 1) a paper titled "A Prototype of ODA Document Processing System (3)—Layout Process—" reported by Hayashi, Saito, Ishida and Murata in Proceedings (Sep. 12, 1988) of the 37-th General Meeting of the Information Processing Society of Japan, 2) a paper titled "A Method of Document Layout Process based on ODA (1)—Issues on Backtrack" reported by Murayama, Yamaguchi, Matsudaira, Uhehara and Kayimasa in Proceedings (Mar. 14, 1990) of the 40-th Annual Convention of the Information Processing Society of Japan, 3) a paper titled "A Method of Document Layout Process Based on ODA (2)—A Consideration of Efficiency" reported by Matsudaira, Yamaguchi and Uhehara in Proceedings (Mar. 14, 1990) of the 40-th Annual Convention of the Information Processing Society of Japan, and 4) a paper titled "A Method of Document Layout Process Based on ODA (3)—Processing Repetitive Construction" reported by Yamaguchi, Matsudaira, Uhehara and Kagimasa in Proceedings (Mar. 14, 1990) of the 40-th Annual Convention of the Information Processing Society of Japan.

In such document processing systems as disclosed in such proceeding literatures, it is considered that erroneous selection might be carried out several times in the course of generating a layout structure but a right layout structure satisfying the restriction conditions can eventually be non-manually or automatically generated.

In the above respective document processing systems, however, for the purpose of returning to such a state as to allow selection of another candidate, an alternate candidate is generated on the basis of the structure generation restriction, that is, consideration is paid only to the layout structure and no consideration is not paid at all to that position in the logical structure from which layout process is restarted. This involves a problem when re-layout process is required because a structure to be alternated is generated on the basis of the layout directive restriction.

Explanation will next be made as to a detailed example of he re-layouting problem by referring to FIGS. 9 and 13.

In FIG. 9, a part above a chain-dotted line A denotes a logical structure while a part below the line A denotes the contents of a document. In each of FIGS. 10 to 13, a part above a chain-dotted line A denotes a logical structure, a part below a chain-dotted line B denotes a layout structure, and a part sandwiched by the lines A and B therebetween denotes the contents of a document. In this connection, the logical structure and the document contents in each drawing are the same as the counterparts in FIG. 9.

In FIGS. 9 to 13, further, 'logical root', 'chapter 1', 'section 1.1', 'section 1.2', 'chapter 2', 'section 2.1', 'section 2.2' and 'section 2.3' represent respectively a logical object, whereas 'layout root', 'page 1', 'frame 1', 'block 1—1', 'block 1-2', 'page 2', 'frame 2', 'block 2-1', 'block 2—2', 'page 2'', 'frame 2'', 'block 2'-1' and 'block 2'-2' represent respectively a layout object.

Assume now that layout process is carried out as shown by a logical structure in FIG. 9. Then, since the 'chapter 2' logical object has a 'page change' layout directive restriction, the document processing system, when it is desired to lay out the 'chapter 2' logical object, generates a new page and adds it to the layout structure.

And the document processing system performs its layout process in such a manner that the contents linked to the lower structure of the 'chapter 2' logical object are laid out from its page.

Assume now that, in the course of laying out the contents of the 'chapter 2', a backtrack took place for some reason and page 2 was alternated in such a layout state as shown, for example, in FIG. 11. In this case, layout process must be restarted originally from the logical object ('chapter 2' logical object in FIG. 11) having the 'page change' layout directive restriction. However, this prior art system cannot clearly find the logical object for the layout process to be restarted. For this reason, in the prior art system, the logical object linked to the contents laid out for the beginning of the page to be alternated, that is, the 'section 2.1' logical object might be selected as the logical object to be restarted as shown in FIG. 12. In this case, the 'page change' layout directive restriction imposed on the 'chapter 2' logical object is not applied to the 'section 2.1' logical object so that the leading contents of the 'chapter 2' are laid out for the page (page 1) preceding the alternate candidate page (page 2) as shown in FIG. 13.

In this way, the prior art method of layout process has had such a problem that, since no consideration is taken as to the fact that the alternate candidate selection influences what layout directive restriction, it is impossible to select the alternate candidate always correctly.

SUMMARY OF THE INVENTION

It is therefore an object of the present invention to provide a method of document layout process which can accurately determine an alternate candidate to a layout structure and also a system embodying the same method.

In accordance with an aspect of the present invention, the above object is attained by a document processing system which comprises detection means for detecting the fact that the layout structure of the document being generated does not conform to predetermined restriction conditions on the document layout, and backtrack range decision means, when the detection means detects an unconformity between the layout structure and the predetermined restriction conditions, for deciding desired one of constituent elements forming the logical structure of the document taking a backtrack influence range into consideration for restart of the layout process.

In the present invention, while such a layout structure of the document as to conform to the restriction conditions is generated, if the layout structure comes to an unconformity to the restriction conditions, then the system determines desired one of the constituent elements of the logical structure for the layout process to be restarted, taking the backtrack influence range into consideration. Therefore, generation and deletion of unnecessary layout structures can be minimized.

Other objects and effects of the present invention will be easily appreciated from the following detailed explanation and the attached drawings.

DESCRIPTION OF THE PREFERRED EMBODIMENTS

An embodiment of the present invention will be described with reference to the attached drawings.

Figure 1:
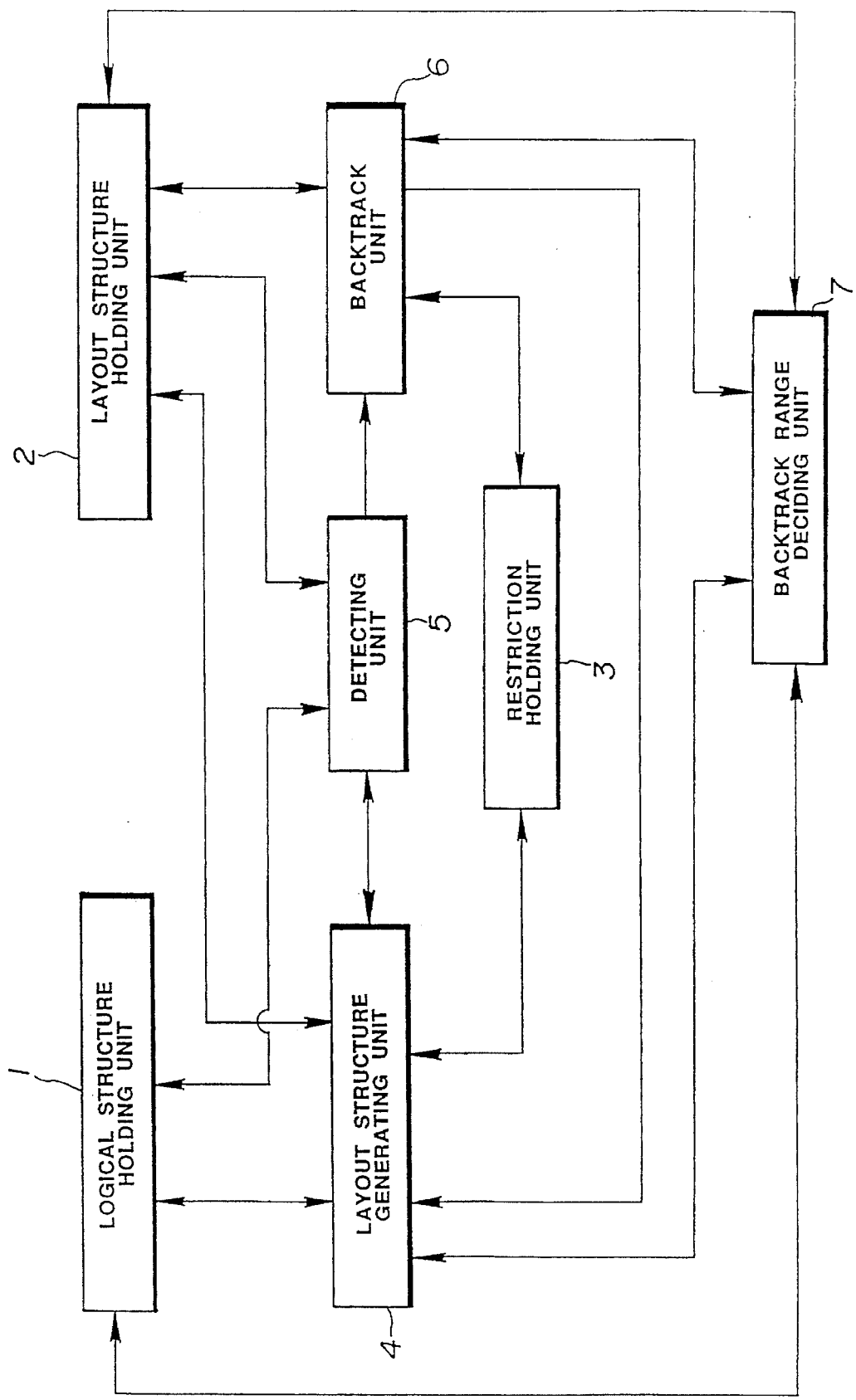
FIG. 1 is a functional block diagram of a document processing system in accordance with an embodiment of the present invention.

Referring first to FIG. 1, there is shown a functional block diagram of a document processing system in accordance with an embodiment of the present invention, in which layout process is carried out based on the aforementioned ODA (Open Document Architecture: (ISO 8613). The document processing system according to the present invention may be applied also to such an apparatus having a document processing function as, for example, a document processing apparatus, a workstation or a word processor.

In FIG. 1, the document processing system includes a logical structure holding means 1 for holding the logical structure of a document, a layout structure holding means 2 for holding the layout structure of the document, a restriction holding means 3 for holding restriction conditions (including the aforementioned layout directive and structure generation restrictions) on the document layout process, a layout-structure generating means for generating an allocating structure on the basis of the logical structure, a detection means 5 for detecting the fact that the layout structure being generated fails to satisfy the above restriction conditions, a backtrack means 6 for performing again its layout process when the detection means 5 detects the failure of the layout structure to satisfy the above restriction conditions, and a backtrack range deciding means for determining a desired logical arrangement to be subjected to a layout restart on the basis of the constituent elements of the logical structure.

Figure 2:
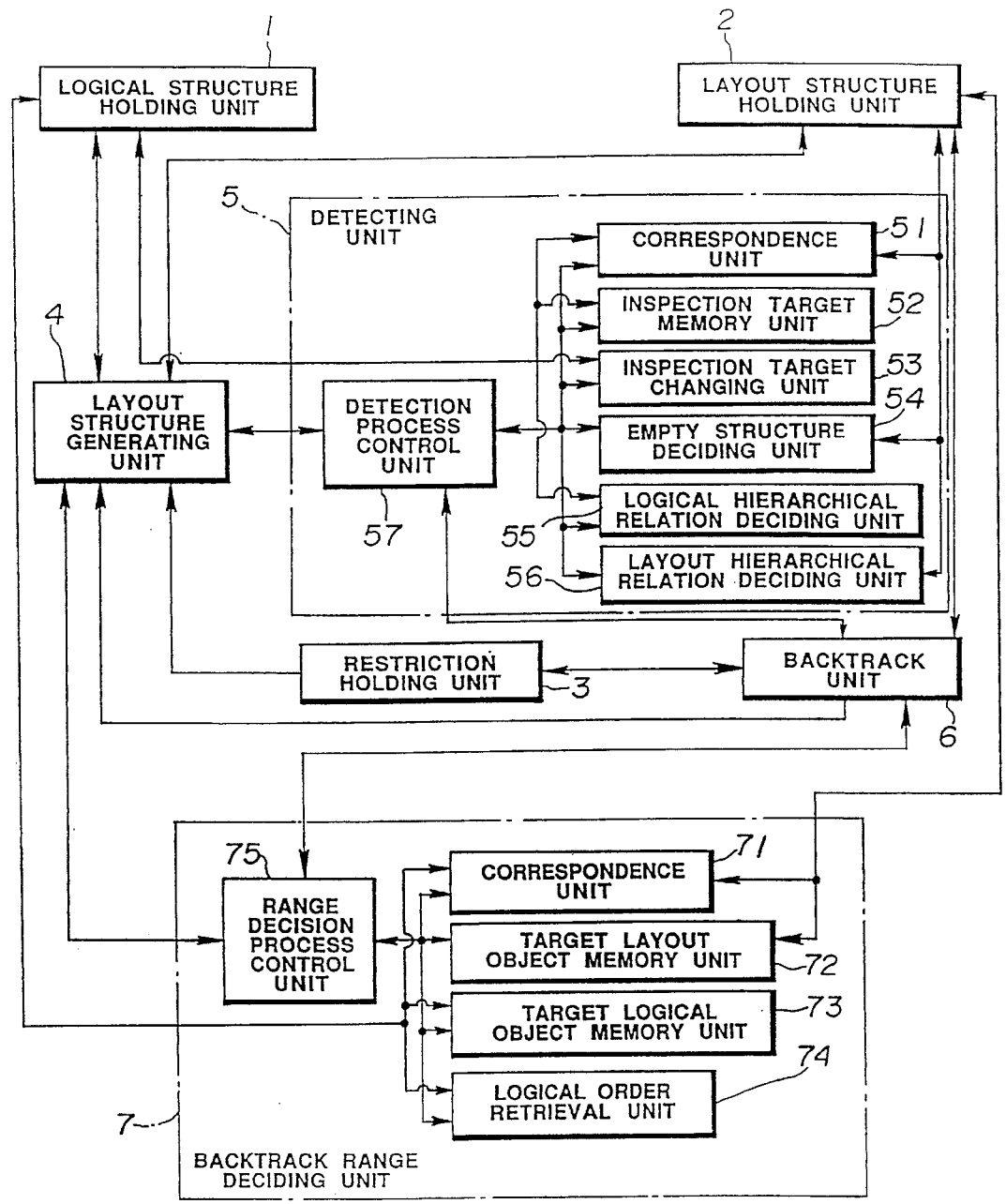
FIG. 2 is a functional block diagram showing the system of FIG. 1, in particular, detailing particular parts of the system.

Shown in FIG. 2 is a functional block diagram of the document processing system of FIG. 1, showing, in particular, the details of the detection means 5 and the backtrack range deciding means 7 in FIG. 1. More specifically, the detection means 5, as illustrated, comprises a correspondence means 51 for making a correspondence between a logical object, a layout object and a layout directive attribute name and for storing the correspondence therein, an inspection target memory means 52 for storing therein the logical object to be inspected, an inspection target changing means 53 for changing the logical object to be inspected by referring to the data of the logical structure holding means 1, an empty-structure decision means 54 for determining the presence or absence of a structure in which no layout process is carried out for subordinate objects of a certain layout object, a logical hierarchical relation decision means 55 for determining whether or not a logical object is included in a subordinate structure of another logical object by referring to the data of the logical structure holding means 1, a layout hierarchical relation decision means 56 for determining whether or not a layout object is included in a subordinate structure of another layout object, and a detection process control means 57 for performing data transfer with the layout structure generating means 4 and the backtrack means 6 and also for controlling the same means 4 and 6 to control a detection process.

In the present embodiment, inspection of the detection means 5 about whether or not to satisfy the layout directive attribute is roughly divided into two stages.

In the first stage, it is checked whether or not "when contents to be subjected to layout process becomes null with respect to subordinate layout objects of the layout object selected as satisfying a 'layout object class' attribute, any of the subordinate layout objects remains still."

In the second stage, it is checked whether or not "when contents to be subjected to layout process is still present with respect to the subordinate layout objects of the layout object selected as satisfying the 'layout object class' attribute, an 'indivisibility' attribute or a 'same layout object' attribute, layout process takes place with respect to layout objects other than the above subordinate layout objects."

In this connection, the above 'layout object class', 'indivisibility' and 'same layout object' attributes as well as a 'new layout object' attribute to be explained later form a part of the attributes of the layout directive restriction defined based on the aforementioned ODA. One or ones of these attributes may be associated with a logical object.

On the other hand, the backtrack range deciding mean 7 comprises a correspondence means 71 for making a correspondence between a layout object and a logical object and storing the correspondence therein, a target layout object memory means 72 for storing therein a layout object to be alternated by a backtrack, a target logical object memory means 73 for storing therein a logical object allocated in association with the layout object stored in the target layout object memory means 72, a target logical order retrieval means 74 for retrieving one of the logical objects stored in the target logical object memory means 73 which is the first in the logical order, and a range decision process control means 75 for performing data transfer with the layout structure generating means 4 to control the above respective means and also a decision process determining a backtrack influence range.

In the present embodiment, the logical structure holding means 1, layout structure holding means 2, restriction holding means 3, inspection target memory means 52, target layout object memory means 72 and target logical object memory means 73 comprise respectively a memory.

The layout structure generating means 4, backtrack means 6, correspondence means 51, inspection target changing means 53, empty structure decision means 54, logical hierarchical relation decision means 55, layout hierarchical relation decision means 56, detection process control means 57, correspondence means 71, logical order retrieval means 74 and range decision process control means 75 may be realized, for example, by a central processing unit executing software (program) for carrying out the respective functions of the above means. Of course, these means may be realized in the form of hardware or firmware.

With the aforementioned arrangement, explanation will next be made as to the detecting process of the document processing system by referring to the flowchart of FIG. 3.

In more detail, the layout structure generating means 4 first selects non-layout one of the logical objects stored in the logical structure holding means 1 and then examines the layout structure holding means 2 and the restriction holding means 3 to select one of the layout objects stored in the layout structure holding means 2 which is suitable as a layout destination for the above selected logical object. This means to utilize the layout structure already stored in the layout structure holding means 2. An example of such layout-structure utilizing method is to utilize a minimum layout structure common to all specific layout structures generatable from a layout structure (corresponding to the generic layout structure according to the ODA). This minimum layout structure is disclosed in Japanese Patent Application. No. 2-157068 filed on Jun. 15, 1990 in Japan.

The layout structure generating means 4, in the case where there is not present a suitable layout object in the layout structure holding means 2, generates a suitable layout object based on the restriction conditions held in the restriction holding means 3 and stores it in the layout structure holding means 2. Next, the layout structure generating means 4 selects a logical object and a layout object as a candidate for the layout destination of the logical object and sends a start signal to the detection means 5. The detection means 5, when receiving the start signal from the means 4, examines whether or not the layout structure so far laid out satisfies the restriction conditions, because the reception of the start signal means to get a control authority of the entire layout process.

In the present embodiment, the logical and layout objects selected by the layout structure generating means 4 are also referred to as the 'selected logical' and 'selected layout' objects, respectively.

The detection means 5 having gotten the control authority of the entire layout process first executes the first stage inspection. More specifically, the detection process control means 57 initializes an object to be inspected, and then inquires of the layout structure generating means 4 about the 'selected logical' object. The detection process control means 57, when receiving an inquiry result from the layout structure generating means 4, orders the inspection target changing means 53 to store a logical object preceded by one (in the logical order) with respect to the 'selected logical' object in the inspection target memory means 52.

Figure 3:
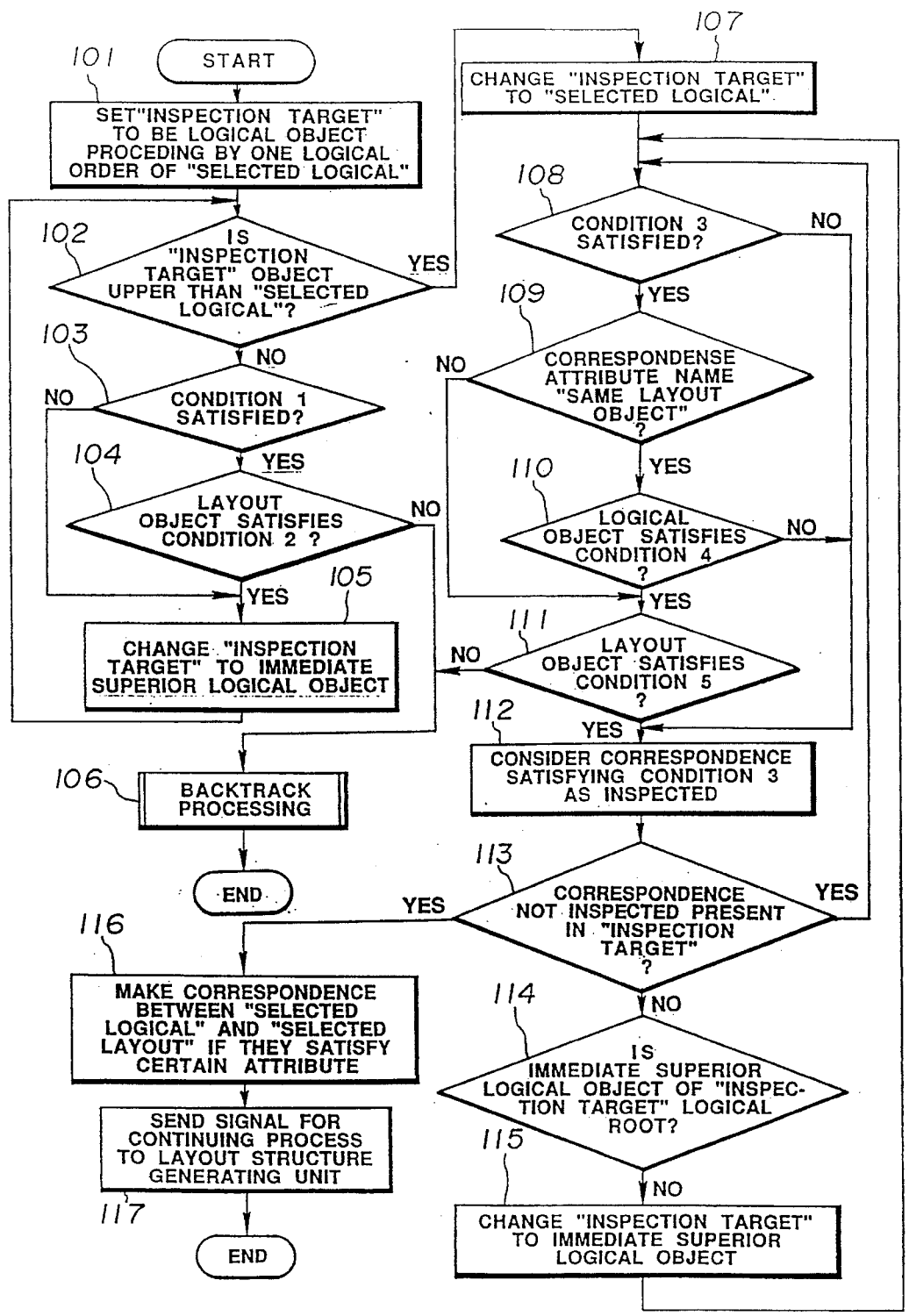
FIG. 3 is a flowchart for explaining the detecting process of the present embodiment.

This causes, as shown in FIG. 3, the inspection target changing means 53 to retrieve the logical structure holding means 1 store a logical object conforming to the above instruction in the inspection target memory means 52 (step 101) and then send a signal indicative of the completion of execution of the instruction to the detection process control means 57. The means 57, when receiving the signal from the inspection target changing means 53, orders the logical hierarchical relation decision means 55 to decide whether or not the logical object (which will be referred to as the 'inspection target', hereinafter) stored in the inspection target memory means 52 corresponds to the logical object immediately superior to the 'selected logical' object. The logical hierarchical relation decision means 55 retrieves the logical structure holding means 1 and returns a result of the instruction to the detection process control means 57 (step 102).

When the returned result is indicative of the fact that the 'inspection target' corresponds to the logical object immediately above the 'selected logical' object, the detection process control means 57 shifts its inspecting process into the second stage because the first stage inspection is unnecessary. If not, then the detection process control means 57 judges whether or not the 'inspection target' satisfies a condition 1 (which will be explained below) (step 103). The condition 1 is that "the 'inspection target' is associated with the layout object by means of the correspondence means 51 and its correspondence attribute name is 'layout object class'."

When the 'inspection target' satisfies the condition 1 in the step 103, the detection process control means 57 instructs the empty-structure judgement means 54 to judge whether or not the 'inspection target' meets a condition 2 (which will be described later). The empty-structure judgement means 54 responsive to this instruction retrieves the layout structure holding means 1 and judges whether or not the 'inspection target' satisfies the condition 2 (step 104) and returns its judgement result to the detection process control means 57.

The condition 2 is that "all the layout objects associated with the 'inspection target' by means of the correspondence means 51 are subjected to layout process of contents with respect to their subordinate structures."

When the condition 1 is not satisfied in the step 103 (when it is unnecessary to inquire of the empty-structure decision means 54) or when the condition 2 is satisfied in the step 104 (when the detection process control means 57 knows, as a result of inquiry to the empty-structure decision means 54, that all the subordinate structures of the layout objects associated with the 'inspection target' are laid out); the detection process control means 57 instructs the inspection target changing means 53 to store the immediate superior logical object of the current 'inspection target' as the 'inspection target'. The inspection target changing means 53 retrieves the logical structure holding means 1, stores a logical object conforming to the instruction order in the inspection target memory means 52, and sends a signal indicative of the completion of execution of the instruction to the detection process control means 57 (step 105). After the processing of the step 105 is completed, control is returned to the step 102 and the subsequent steps are executed.

When the condition 2 is not satisfied in the step 104 (when the inquiry result from the empty-structure decision means 54 indicates that the subordinate structure of any of the layout objects associated with the 'inspection target' is not laid out), this means that there exists a remaining layout structure in spite of the fact there is no contents to be laid out. Therefore, the detection process control means 57 sends a start signal to the backtrack means 6 to transfer the control authority of the entire layout process to the backtrack means 6 and to execute its backtracking process (step 106). The backtracking process will be detailed later.

A series of such processes (steps 101 to 106) are repeated until the condition for shifting to the second stage inspection is satisfied. When the first stage inspection condition is satisfied (YES in the step 102), the detection process control means 57 carries out the second stage inspection.

In this second stage inspection, the detection process control means 57 first inquires of the layout structure generating means 4 about the 'selected logical' object and when receiving its inquiry result from the means 4, instructs the inspection target changing means 53 to store the 'selected logical' object as the 'inspection target'. The inspection target changing means 53 retrieves the logical structure holding means 1, stores a logical object conforming to the instruction in the inspection target memory means 52, and sends a signal indicative of the completion of execution of the instruction to the detection process control means 57 (step 107). The detection process control means 57, when receiving the signal from the inspection target changing means 53, judges whether or not the 'inspection target' satisfies a condition 3 to be described later (step 108). The condition 3 is that "the 'inspection target' is associated with the layout object by the correspondence means and no inspection (second stage inspection) is carried out with respect to the layout object."

When the condition 3 is satisfied, the detection process control means 57 judges whether or not the attribute name associated with the 'inspection target' is 'same layout object' (step 109). If so, then the detection process control means 57 orders the logical hierarchical relation decision means 56 to judge whether or not the 'selected logical' object satisfies a condition 4 (to be described below) (step 110). The condition 4 is that "the 'selected logical' object is an object appearing on leftdepth first search path from the 'inspection target'."

When the relationship between the 'selected logical' object and the 'inspection target' satisfies the condition 4 in the step 110 or when the associated attribute name is not the 'same layout object' attribute in the step 109, the detection process control means 57 inquires of the layout structure generating means 4 about the 'selected layout' object and order the logical hierarchical relation decision means 56 to judge whether or not the 'selected layout' object satisfies a condition 5 (to be described below) (step 111). The condition 5 is that "the 'selected layout' object is a subordinate layout object of the layout object associated with the 'inspection target' or the 'selected layout' object is the same as the layout object associated with the 'inspection target'."

That is, in the step 111, the hierarchical relationship the 'selected layout' object and the layout object associated with the 'inspection target' is judged.

When the logical hierarchical relation decision means 56 determines in the step 111 that the condition 5 is not met, contents to be laid out with respect to the subordinate structure of the layout object associated with the 'inspection target' is laid out with respect to a layout object other than the above layout object. Accordingly, the detection process control means 57, as in the processing of the step 106, sends a start signal to the backtrack means 6 to transfer the control authority of the entire layout process to the backtrack means 6.

When it is determined in the step 111 that the 'selected layout' object is included in the subordinate structure of the layout object associated with the 'inspection target', this means that the restriction condition is satisfied. Accordingly, the detection process control means 57 handles the associated layout object satisfying the condition 3 as an inspected one (step 112) and further judges whether or not any associated layout object not inspected yet is present as an 'inspection target' (step 113). Since a logical object may have one or more attributes as the layout directive restriction imposed thereon according to the ODA, the above process means to inspect in the step 113 whether or not all attributes related to the logical object as the 'inspection target' are for the associated layout object satisfying the condition 3.

When it is in the step 113 judged that the associated layout objects have all been inspected, the detection process control means 57 orders the logical hierarchical relation decision means 56 to judge whether or not the immediate superior logical object of the 'inspection target' is a logical root (step 114). If it is a logical root then the second stage inspection is completed, whereas if it is not a logical root then the detection process control means 57 orders the inspection target changing means 53 to store the immediate superior logical object of the 'inspection target' as the 'inspection target'. The inspection target changing means 53, when receiving this instruction from the detection process control means 57, retrieves the logical structure holding means 1, stores a logical object conforming to the instruction in the inspection target memory means 52 (step 115), and sends a signal indicative of the completion of execution of the instruction to the detection process control means 57.

The detection process control means 57 performs such a series of processes (steps 108 to 114) over the current 'inspection target'. And in the case where it is determined in the step 114 to be a logical root (after completion of the second stage inspection), when the 'selected layout' object is selected to satisfy any of the 'layout object class', 'indivisibility' and 'same layout object' attributes, the detection process control means 57 orders the correspondence means 51 to make correspondence between the 'selected logical' object and the 'selected layout' object together with its layout directive attribute name.

In response to this, the correspondence means 51 makes the correspondence so as to satisfy the instruction (step 116) and sends a signal indicative of the completion of execution of the instruction to the detection process control means 57.

The means 57, when receiving the signal from the correspondence means 51, sends to the layout structure generating means 4 a signal for continuation of the processing to transfer the control authority of the entire layout process to the layout structure generating means 4 (step 117). This causes the layout structure generating means 4 to actually lay out the logical and layout objects being now selected (in which case it is assumed that the logical object is already laid out). The layout structure generating means 4, when receiving a signal indicative of the completion of a backtrack from the backtrack means 6, restarts its processing from a logical object newly re-selected by the backtrack means 6.

In the aforementioned processing procedure, the first stage inspection is carried out through the execution of the steps 101 to 105, while the second stage inspection is carried out through the execution of the steps 107 to 115.

The backtrack means 6 having gotten the control authority examines the layout structure holding means 2 and the restriction holding means 3 to search a structure for restarting the layout process. In the case where the backtrack means 6 finds the corresponding structure, the backtrack means 6 adds or deletes the layout object with respect to the layout structure held in the layout structure holding means 2 so as to conform to the restriction condition held in the restriction holding means 3. In the event where the backtrack means 6 deletes the layout structure, the means 6 orders the backtrack range deciding means 7 to decide the backtrack range.

In this case, for the purpose of deciding the backtrack range, the backtrack range deciding means 7 is required to hold a data relating to how the layout structure is generated under what layout directives. Thus, explanation will next be made as to the data holding process of the backtrack range deciding means 7.

First, assume that the 'new layout object', 'layout object class', 'indivisibility' or 'same layout object' attribute of the layout directive attributes is previously stored in the restriction holding means 3 as a directive attribute associated with a logical object held in the logical structure holding means 1. Assume further that the layout structure generating means 4 finds a layout object suitable as a layout destination for the logical object from the layout structure holding means 2 or newly generates the layout object and adds it to the layout structure holding means 2. Assume in addition that the detection means 5 determines that the 'selected logical' object and the 'selected layout' object satisfy all the restriction conditions in the restriction holding means 3 at the current time point.

Then the layout structure generating means 4 sends to the range decision process control means 75 a signal indicative of the completion of execution of a new layout process. The range decision process control means 75, when receiving the signal from the layout structure generating means 4, instructs the correspondence means 71 to make a correspondence between the 'selected logical' object obtained by inquiring of the layout structure generating means 4 and the 'selected layout' object. The correspondence means 71, after making the correspondence so as to satisfy the instruction, sends a signal indicative of the completion of the processing to the range decision process control means 75. The means 75, when receiving the completion indicative signal from the correspondence means 71, sends to the layout structure generating means 4 a signal indicative of the acquisition of a data for range decision.

Figure 4:
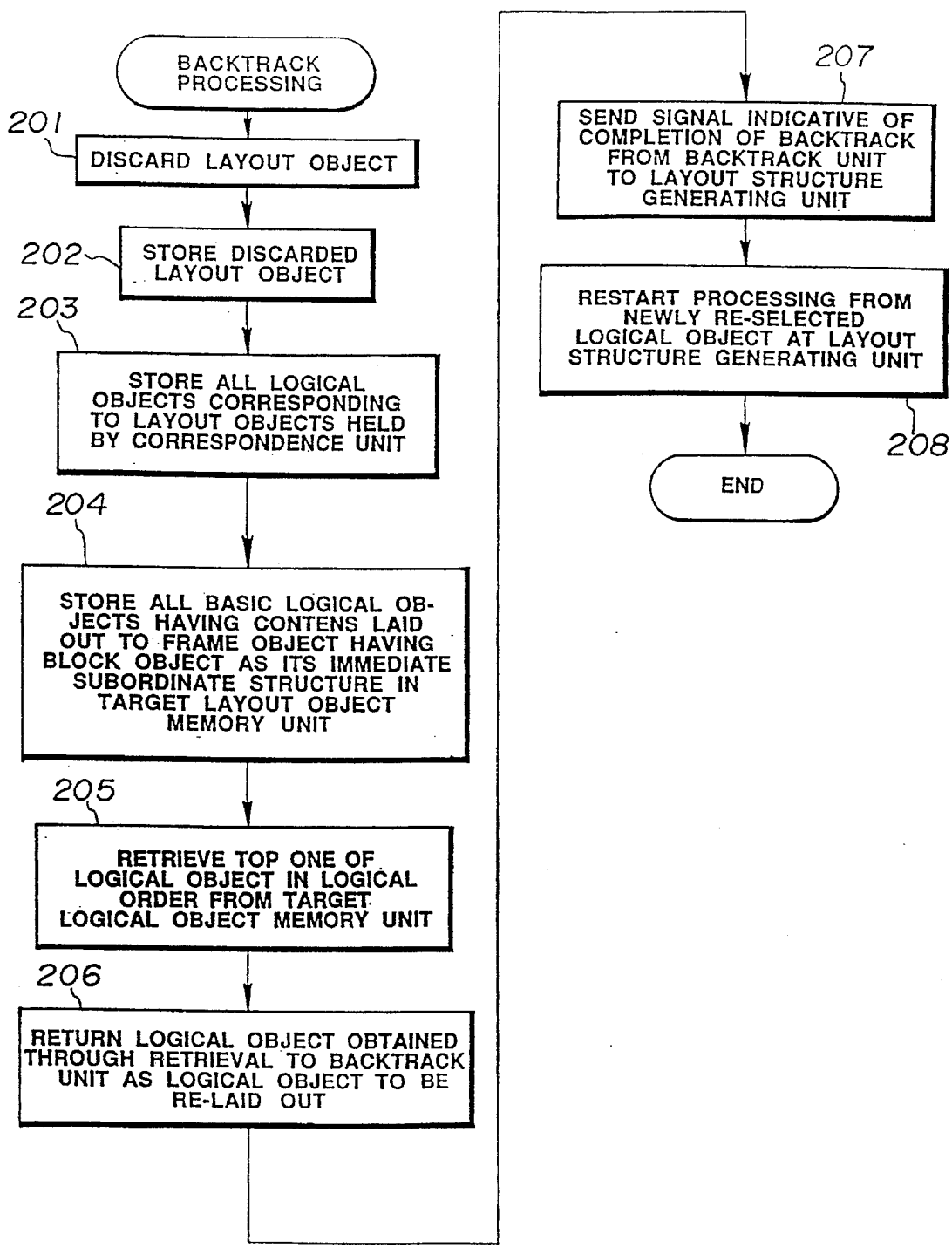
FIG. 4 is a flowchart for explaining the backtrack range determining process of the present embodiment.

Explanation will then be made as to the backtrack-range deciding process when a backtrack takes place, by referring to the flowchart of FIG. 4.

As shown in FIG. 4, the backtrack means 6 having gotten the control authority, when discarding the layout object (step 201), invokes the range decision process control means 75 and sends thereto a signal to store the discarded layout object.

The range decision process control means 75, when receiving the signal from the backtrack means 6, stores the discarded layout object in the target layout object memory means 72 (step 202).

And the backtrack means 6, after completing the generation of an alternate candidate, sends to the range decision process control means 75 a signal indicative of execution of the range decision.

The range decision process control means 75 receiving the signal from the backtrack means 6, when the layout object held in the correspondence means 71 is present in the layout objects stored in the target layout object memory means 72, stores in the target logical object memory means 73 all the logical objects associated with the layout object (step 203). When a frame object having block objects as immediate subordinate objects (i.e., 'lowest level frame object' in an ODA reference model) is present in the layout objects stored in the target layout object memory means 72, the range decision process control means 75 stores in the target logical object memory means 73 all basic logical objects (lowest level logical objects connected with the contents) having the contents allocated to the frame object (step 204).

Next, the range decision process control means 75, when completing the processing for the target layout object memory means 72, orders the logical order retrieval means 74 to retrieve top one of the logical objects of the target logical object memory means 73 in the logical order (step 205) and returns a logical object as its retrieval result to the backtrack means 6 as a logical object for layout to be restarted (step 206).

The backtrack means 6, when receiving the logical object from the range decision process control means 75, sends to the layout structure generating means 4 the received logical object as a newly re-selected logical object together with a signal indicative of the completion of the backtrack (step 207). The layout structure generating means 4, when receiving the signal from the backtrack means 6, restarts its layout process from the logical object (a desired constituent element for the layout to be restarted) newly re-selected by the backtrack means 4 (step 208).

Explanation will next be made as to how to solve the problems already explained in the Paragraph "Description of the Related Art" in accordance with the present embodiment, referring to FIGS. 5 to 8. In these drawings, a part above a chain-dotted line A in each drawing denotes a logical structure, a part below a chain-dotted line B in each drawing denotes a layout structure, and a part sandwiched by these lines A and B denotes document contents. In each drawing, the logical structure and the document contents are the same those of FIG. 9.

Figure 10:
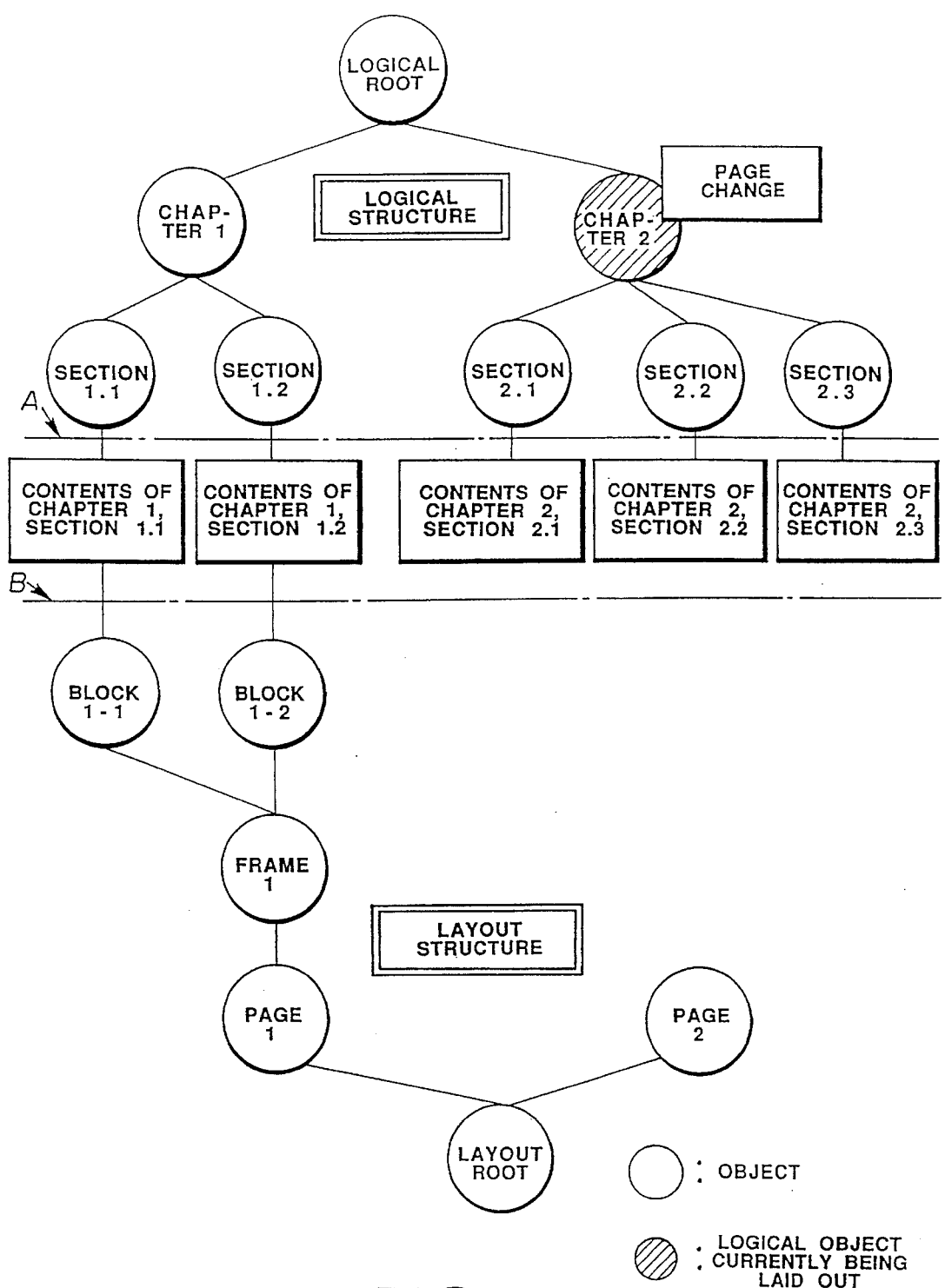
Figure 11:
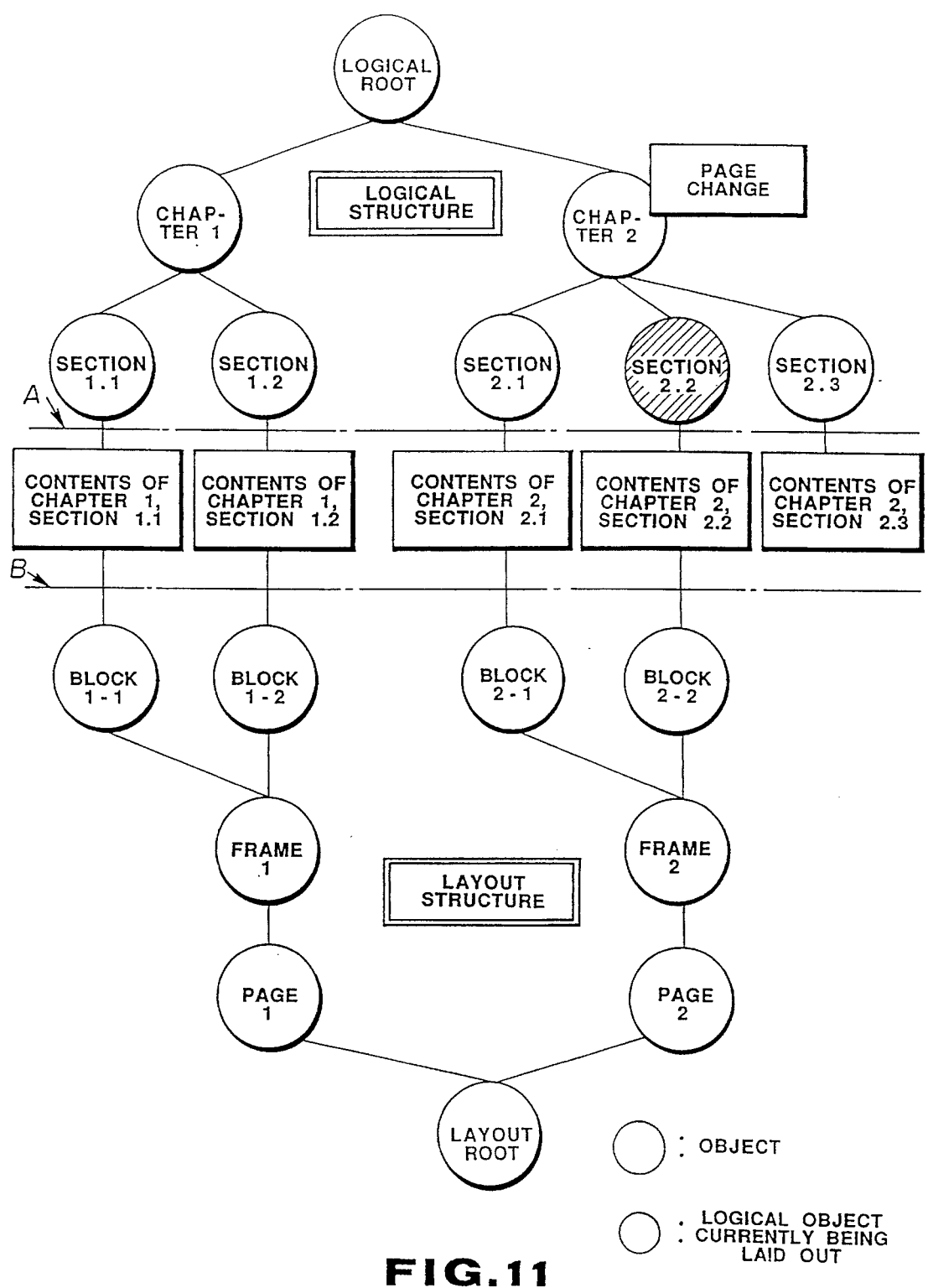
Figure 12:
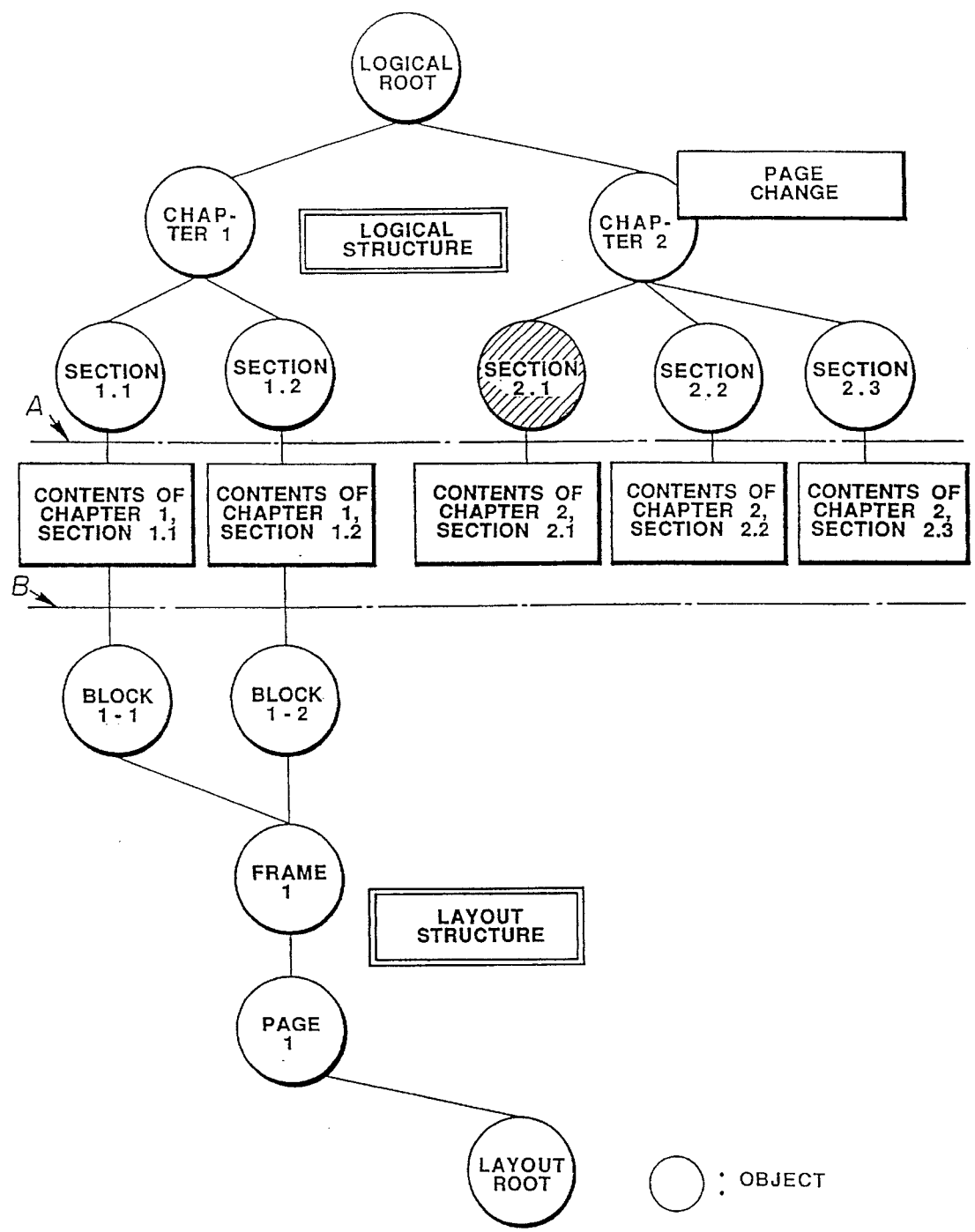

According to the ODA, the logical object titled "Chapter 2" in FIG. 10 and explained in the Paragraph "Description of the Related Art" means that a layout directive attribute 'new layout object having an attribute value 'object type page' is defined with respect to a composite logical object indicative of the "Chapter 2".

In the present embodiment, when the composite logical object and a page object are set by the layout structure generating means 4 to be the 'selected logical' object ('chapter 2' in this example) and the 'selected layout' object ('page 2' in this example), a correspondence between these two objects are made by the correspondence means 51.

Figure 5:
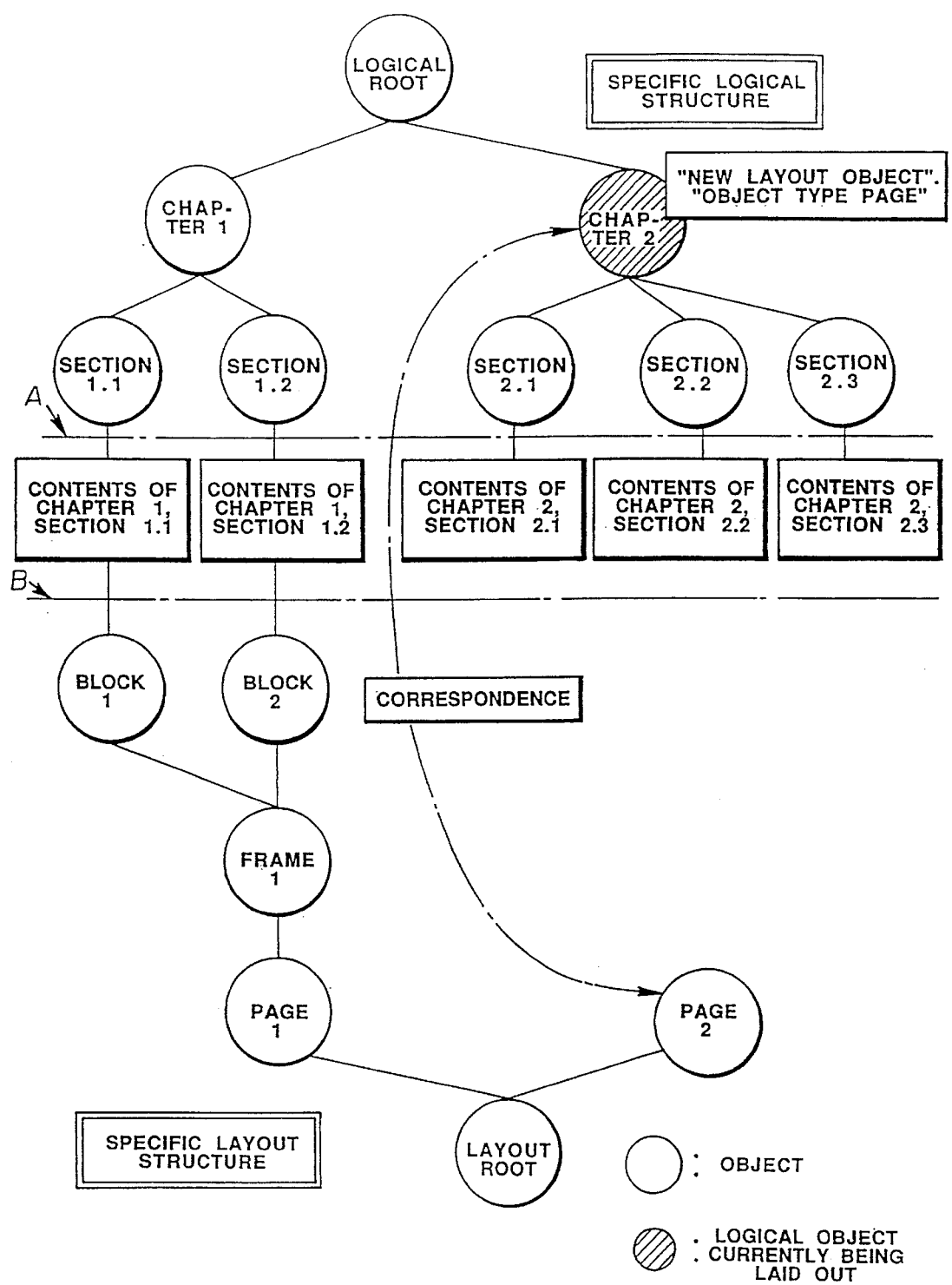
FIGS. 5 to 8 are diagrams for explaining the layout restarting procedure of the present embodiment respectively.

FIG. 5 shows an example showing a layout state between a logical structure when the layout directive attribute 'new layout object' having the attribute value 'object type page' is defined for the composite logical object 'chapter 2' and a layout structure associated with the logical structure. In such a layout state as illustrated, the 'chapter 2' logical object as the 'selected layout' object is associated with the 'page 2' layout object as the 'selected layout' object.

Figure 6:
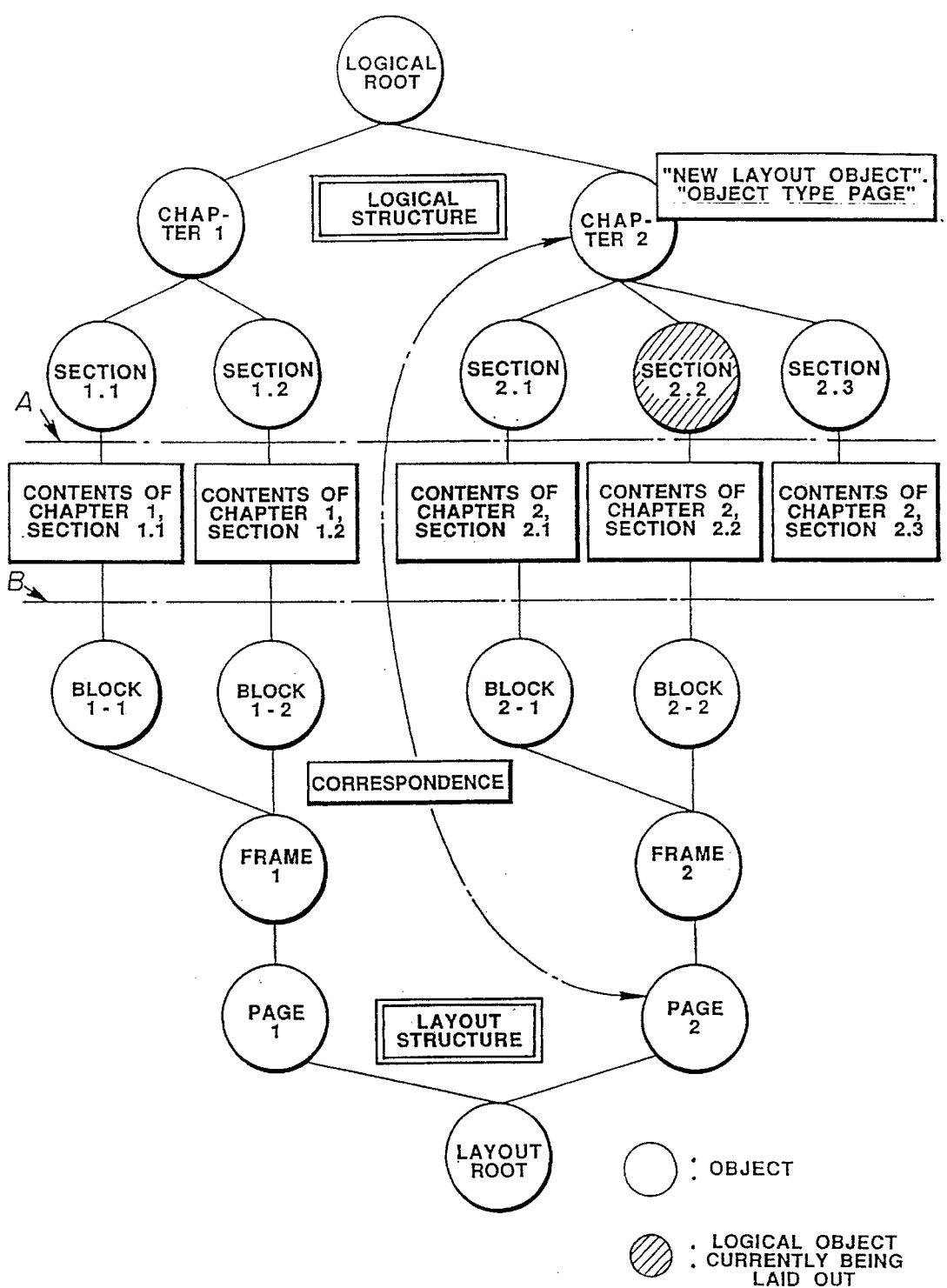
Figure 7:
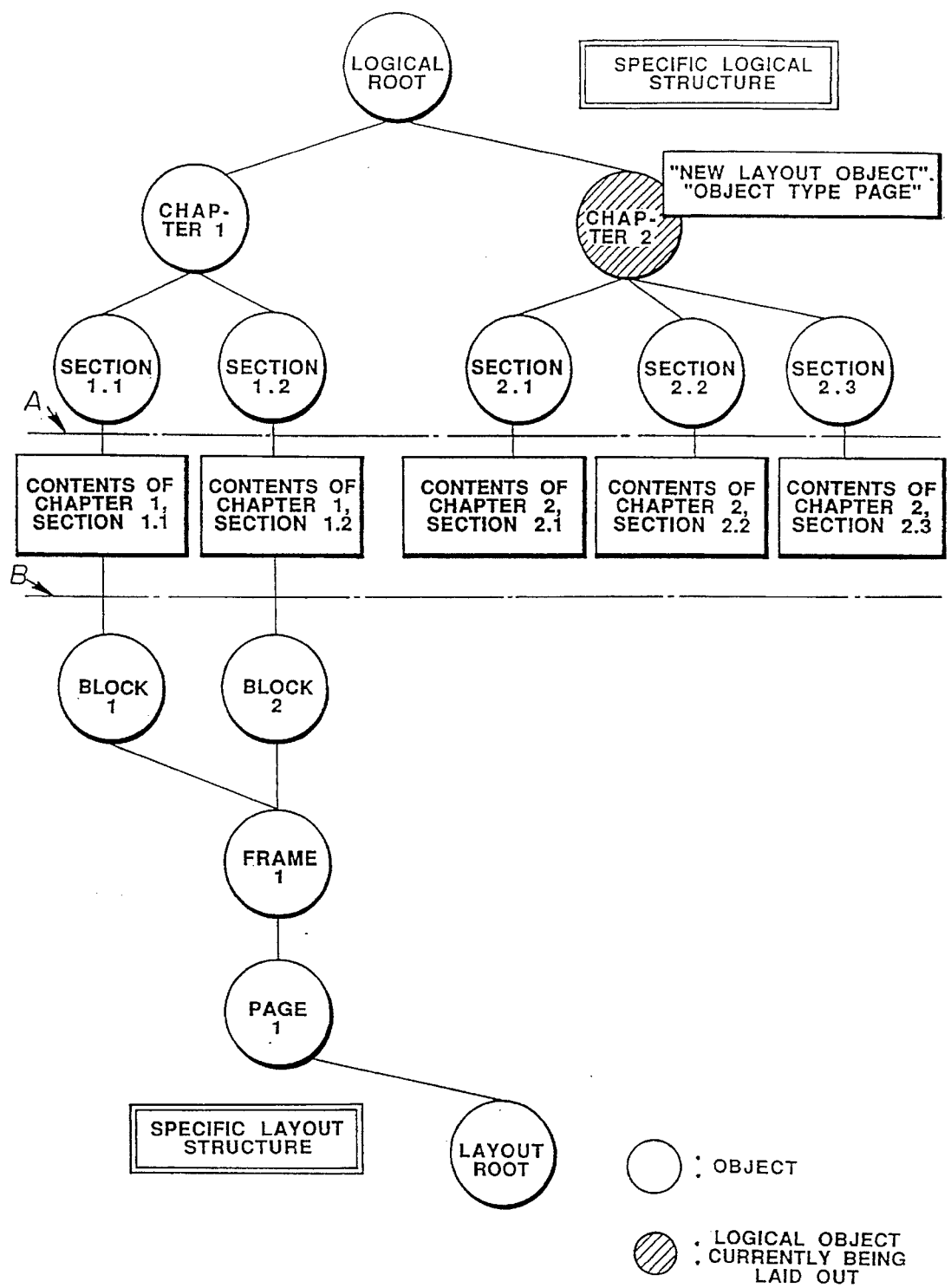

In such a layout state as shown in FIG. 6, when a backtrack takes place and the 'page 2' layout object (page object) is deleted for some reason, the corresponding composite logical object (that is, 'chapter 2' composite logical object) and basic logical objects (that is, 'section 2.1' and 'section 2.2' basic logical objects) are stored in the logical object memory means 73. At this time, among the chapter 2' composite logical object and the 'section 2.1' and 'section 2.2' basic logical objects, the composite logical object is the topmost in the logical order. Accordingly, the 'chapter 2' composite logical object is selected as shown in FIG. 7. When layout process is carried out from such a layout state as shown in FIG. 7, such a layout state having a layout structure (final layout structure) with the 'new layout object' directive attribute rightly evaluated as shown in FIG. 8 is generated.

In this way, control is returned back to the logical object (constituent element) ('chapter 2' composite logical object, in this example) belonging to the range in which the restriction condition is applied to decide a logical object (constituent element) for layout to be restarted.

Figure 8:
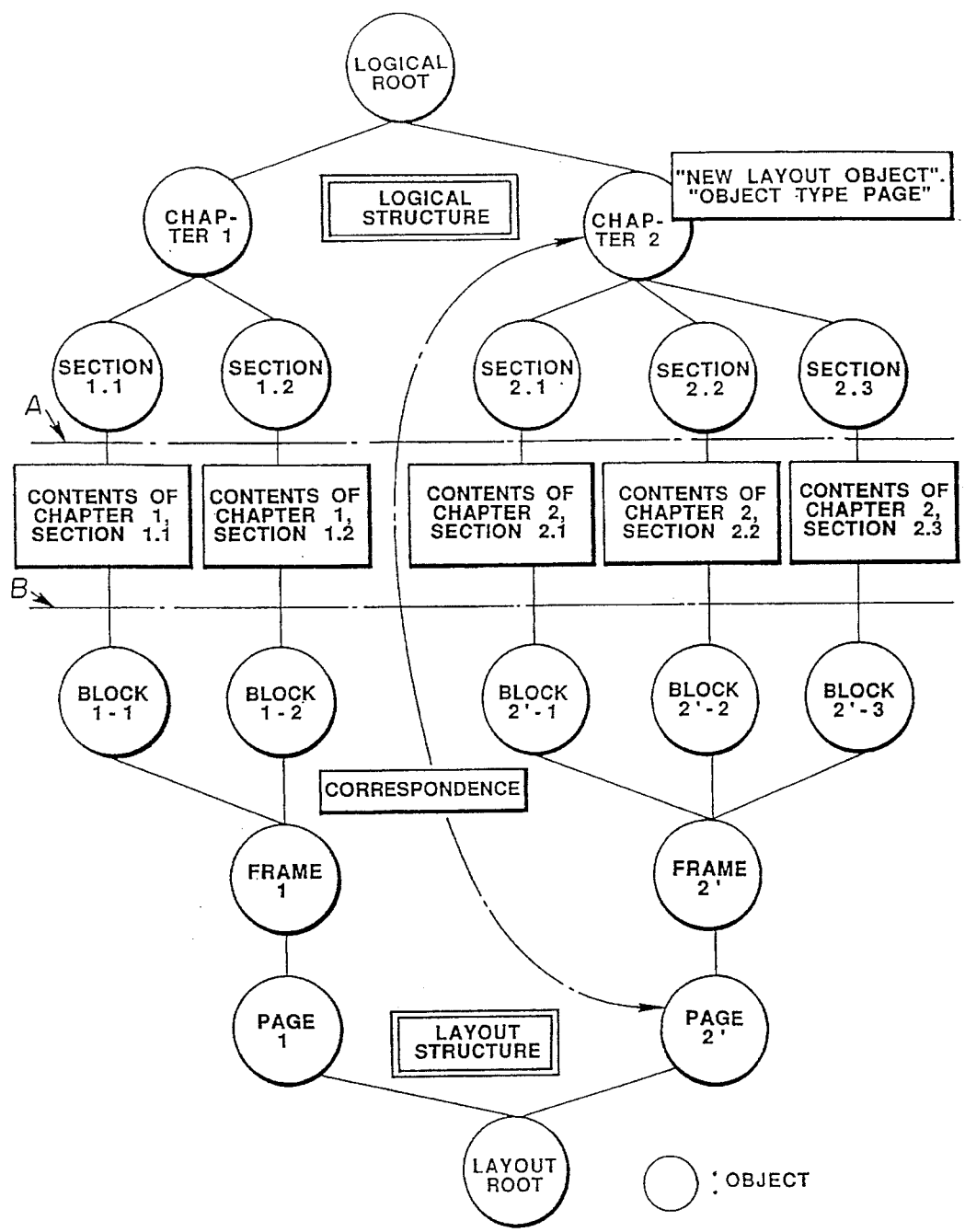
Figure 9:
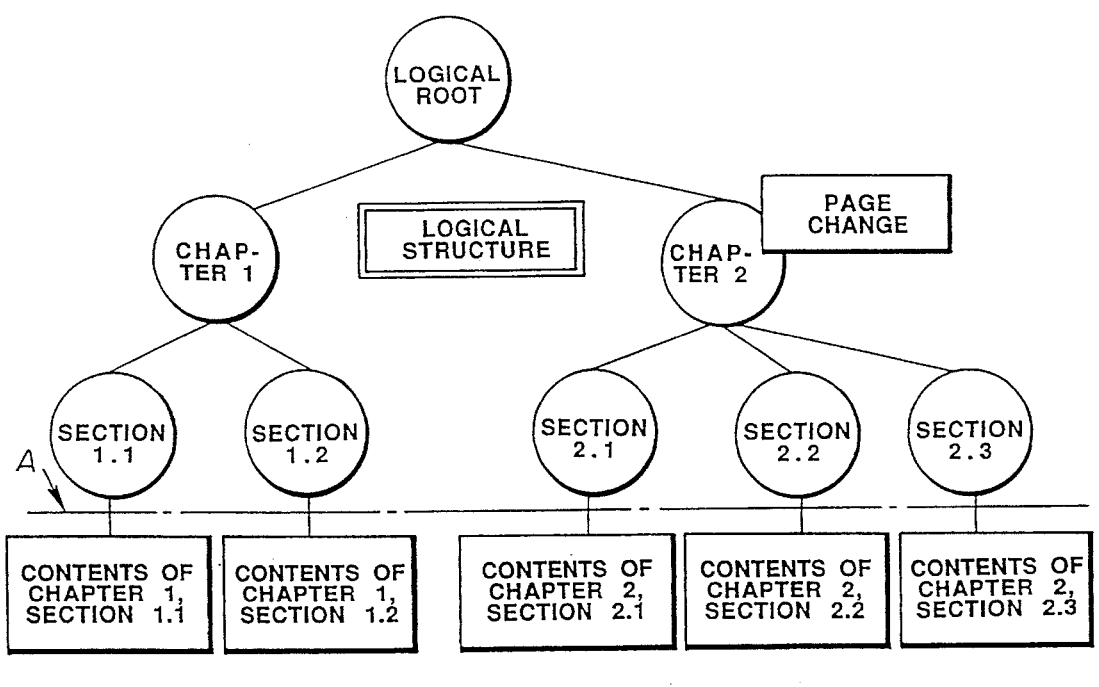
FIGS. 9 to 13 are diagrams for explaining the layout restarting procedure of a prior art document processing system.
Figure 13:
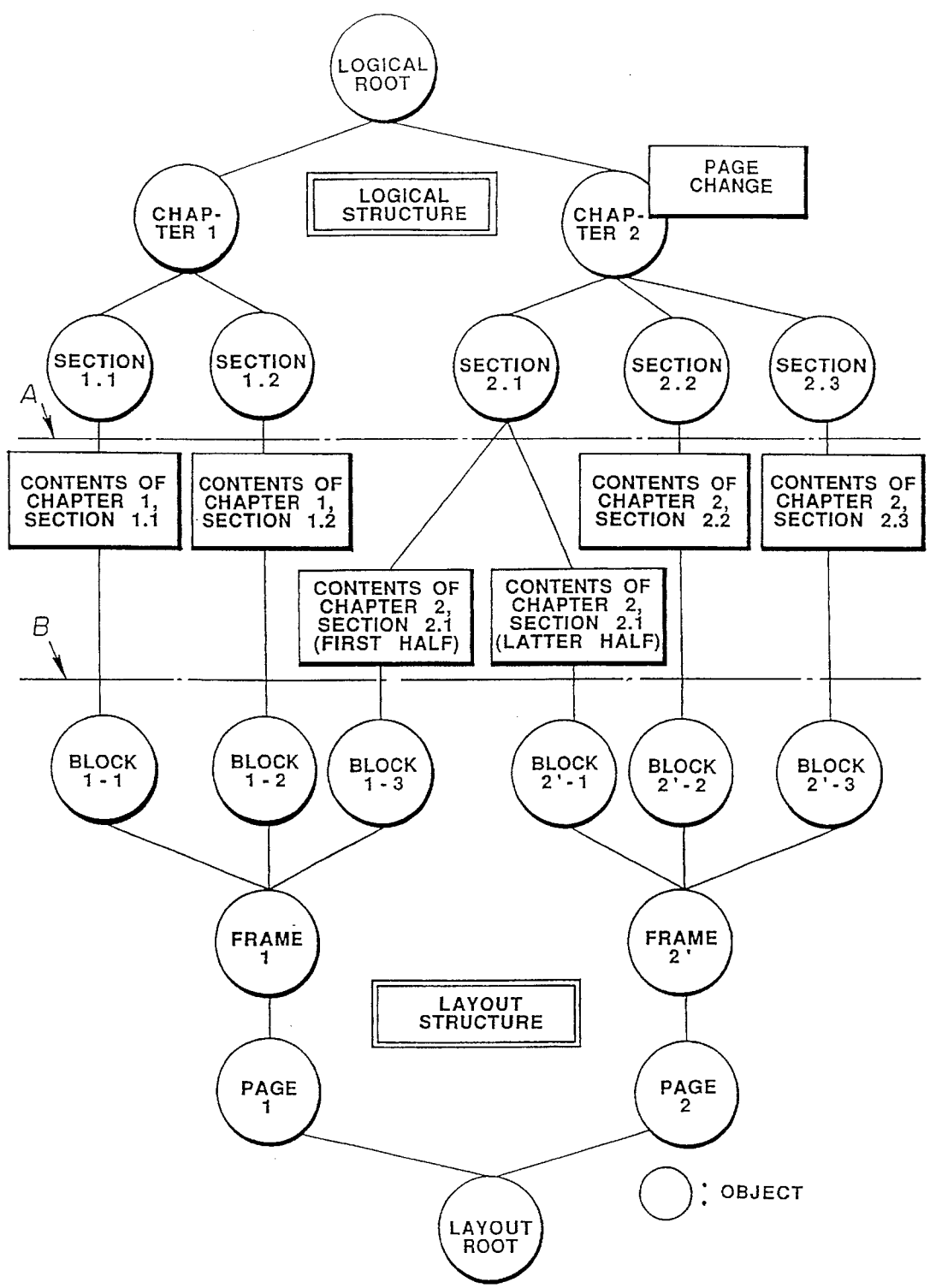

Therefore, in such a layout structure as shown in FIG. 6, even when a backtrack takes place and the backtracking process is carried out, such a backtracking result (layout structure not conforming to the layout directive restriction) in the prior art document processing system as shown in FIG. 13 is not obtained but such a layout structure conforming to the layout directive restriction as shown in FIG. 8 can be obtained. That is, since the layout structure of FIG. 13 does not conform to the layout directive restriction, the layout process ends in a failure and a backtrack again takes place for retry of the layout process.

In the present embodiment, layout process is carried out in an object oriented manner and correspondence is made by providing a special instance variable for logical object itself and by providing thereto a pointer to the corresponding layout object and a pointer to a string of attribute names. As a result, matching of the presence or absence of a correspondence can be easily carried out. Further, the correspondence data may be realized with use of a table or a hashed list.

As has been disclosed in the foregoing, in accordance with the present embodiment, when a layout structure being generated comes to an unconformity to the restriction condition, a backtrack can take place and an accurate logical object for layout process to be restarted can be decided. Therefore, generation and deletion of unnecessary layout structures (layout objects) can be suppressed to a minimum level and layout process can be quickly realized.

In the present invention, since an alternate candidate for the layout structure is decided and layout restart state is determined taking the layout directive restriction into consideration as mentioned above, a right alternate candidate suitable for the layout directive restriction can be selected and therefore generation and deletion of unnecessary layout structures (layout objects can be minimized. As a result, layout process can be quickly effected and thus document generation and editing process can be quickly carried out.

The present invention can be embodied in various ways without departing from the spirit and scope of the invention. It should be understood that the foregoing embodiment has been given only byway of example not as a limitation of the scope of the invention. In other words, the scope of the invention is limited not by the body of the specification but by the scope of the attached claims and thus includes all equivalents, modifications and alternatives within the scope of the claims.

What is claimed is:

1. A method of document processing in which contents of a structured document having a specific logical structure including a plurality of logical objects and also having a predetermined first restriction condition corresponding to at least one of the logical objects are laid out in accordance with a second restriction condition of a predetermined common layout structure, so as to generate a specific layout structure including a plurality of layout objects corresponding to the specific logical structure, the method comprising the steps of:

generating the specific layout structure corresponding to the specific logical structure by carrying out layout process of the contents of the structured document in accordance with said first and second restriction conditions;

when carrying out the layout process, making the logical object having said first restriction condition corresponds to the layout object generated in correspondence with the logical object having said first restriction condition and storing the logical object and the layout object as corresponding to one another;

when said the second restriction condition is not satisfied after the layout object corresponding to the logical object having said first restriction condition has been generated, determining a range of logical objects to which influence of a backtrack extends in accordance with the stored contents; and executing a re-layout process by returning back to the logical object stored as corresponding to the layout object in the determined backtrack range.

2. The method according to claim 1, wherein the specific logical structure is made up of a hierarchial structure of the plurality of logical objects, and the logical objects in said backtrack range are determined to be ones up to a logical object which appears first among the stored logical objects having said first restriction condition by tracing back the hierarchial structure.

3. A document processing system in which contents of a structured document having a specific logical structure including a plurality of logical objects and also having a predetermined first restriction condition corresponding to at least one of the logical objects are laid out in accordance with a second restriction condition of a predetermined common layout structure, so as to generate a specific layout structure including a plurality of layout objects corresponding to the specific logical structure, the system comprising:

Layout process means for generating the specific layout structure corresponding to the specific logical structure by carrying out layout process of the contents of the structured document in accordance with the first and second restriction conditions;

storage means, when the layout process means carries out the layout process, for making the logical object having said first restriction condition correspond to the layout object generated in correspondence with the logical object having said first restriction condition and storing the logical object and the layout object as corresponding to one another;

backtrack range determining means, when said second restriction condition is not satisfied after the layout process means has generated the layout object corresponding to the logical object having the said first restriction condition, for determining a backtrack range of logical objects in accordance with the stored content in the storage means; and relayout means for executing a relayout process by returning back to the logical object in the storage means as corresponding to the layout object in the backtrack range determined by the backtrack range determining means.

4. The system according to claim 3, wherein the specific logical structure is made up of a hierarchial structure of the plurality of logical objects, and the backtrack range determining means determines by tracing back the hierarchial structure of said logical objects in the backtrack range up to a logical object which appears first among the logical objects stored in the storage means and having the first restriction condition.

* * * * *